US011347646B2

United States Patent
Liang et al.

(10) Patent No.: US 11,347,646 B2
(45) Date of Patent: May 31, 2022

(54) METHOD, DEVICE AND COMPUTER PROGRAM PRODUCT FOR MANAGING CACHE BASED ON MATCHING API

(71) Applicant: EMC IP Holding Company LLC, Hopkinton, MA (US)

(72) Inventors: Mengjia Liang, Chengdu (CN); Sandy Yu Yan, Chengdu (CN); Felix Fei Peng, Chengdu (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 16/868,260

(22) Filed: May 6, 2020

(65) Prior Publication Data

US 2021/0209024 A1 Jul. 8, 2021

(30) Foreign Application Priority Data

Jan. 7, 2020 (CN) .......................... 202010014669.1

(51) Int. Cl.
*G06F 12/0862* (2016.01)

(52) U.S. Cl.
CPC .. *G06F 12/0862* (2013.01); *G06F 2212/1016* (2013.01); *G06F 2212/6024* (2013.01); *G06F 2212/6026* (2013.01)

(58) Field of Classification Search
CPC ......... G06F 12/0862; G06F 2212/6024; G06F 2212/6026
See application file for complete search history.

(56) References Cited

U.S. PATENT DOCUMENTS

| 8,935,221 | B1* | 1/2015 | Lazier | G06F 16/24 707/690 |
| 2012/0331213 | A1* | 12/2012 | Harada | G06F 12/121 711/103 |
| 2020/0242037 | A1* | 7/2020 | Navon | G06F 12/0862 |

OTHER PUBLICATIONS

K-nearest neighbors. Article [online], Aishwarya Singh, 2018 [retrieved on May 17, 2021], Retrieved from the Internet: <URL: https://www.analyticsvidhya.com/blog/2018/08/k-nearest-neighbor-introduction-regression-python/>. (Year: 2018).*

* cited by examiner

*Primary Examiner* — Chie Yew
(74) *Attorney, Agent, or Firm* — Womble Bond Dickinson (US) LLP

(57) ABSTRACT

Embodiments of the present disclosure provide a method, device, and computer program product for managing cache. There is provided a method of managing a cache, comprising: receiving a current operation request from a user, data requested by the current operation request being to be duplicated to the cache; obtaining a plurality of historical operation requests of the user, the plurality of historical operation requests being received prior to the current operation request; determining a predicted operation request for the user based on the plurality of historical operation requests and the current operation request; and in accordance with determining that a type of an operation associated with the predicted operation request belongs to predetermined types, adjusting data in the cache based on the predicted operation request. With the embodiments of the present disclosure, it can be determined dynamically and intelligently which data should be cached, the speed of processing user's operation requests can be increased, and the memory space occupied by the cache can be reduced, thereby improving the system performance.

21 Claims, 11 Drawing Sheets

310

GET, GET BYID, POST, PUT, DELETE /api/v2/login
GET, GET BYID, POST, PUT, DELETE /api/v2/logout
GET, GET BYID, POST, PUT, DELETE /api/v2/policies/password
GET, GET BYID, POST, PUT, DELETE /api/v2/roles
GET, GET BYID, POST, PUT, DELETE /api/v2/roles/{roleId}
GET, GET BYID, POST, PUT, DELETE /api/v2/token
GET, GET BYID, POST, PUT, DELETE /api/v2/userGroups
GET, GET BYID, POST, PUT, DELETE /api/v2/userGroups/{userGroupId}
GET, GET BYID, POST, PUT, DELETE /api/v2/users
GET, GET BYID, POST, PUT, DELETE /api/v2/users/{userId}
GET, GET BYID, POST, PUT, DELETE /api/v2/whitelist
GET, GET BYID, POST, PUT, DELETE /api/v2/whitelist/automatic
GET, GET BYID, POST, PUT, DELETE /api/v2/whitelist/csv
GET, GET BYID, POST, PUT, DELETE /api/v2/whitelist/{id}
GET, GET BYID, POST, PUT, DELETE /api/v2/complianceDetails
GET, GET BYID, POST, PUT, DELETE /api/v2/assetComplianceDetails
GET, GET BYID, POST, PUT, DELETE /api/v2/assetProtectionDetails
GET, GET BYID, POST, PUT, DELETE /api/v2/historicalComplianceAssetResults
GET, GET BYID, POST, PUT, DELETE /api/v2/historicalComplianceAssetResults/{id}
GET, GET BYID, POST, PUT, DELETE /api/v2/historicalComplianceMetrics
GET, GET BYID, POST, PUT, DELETE /api/v2/historicalComplianceMetrics/details/assets
GET, GET BYID, POST, PUT, DELETE /api/v2/historicalComplianceMetrics/details/assets/{id}
GET, GET BYID, POST, PUT, DELETE /api/v2/historicalComplianceMetrics/details/plans
GET, GET BYID, POST, PUT, DELETE /api/v2/historicalComplianceMetrics/details/plans/{id}
GET, GET BYID, POST, PUT, DELETE /api/v2/historicalDiscoveryMetrics
GET, GET BYID, POST, PUT, DELETE /api/v2/historicalDiscoveryMetrics/{id}
GET, GET BYID, POST, PUT, DELETE /api/v2/historicalFrontendCapacities
GET, GET BYID, POST, PUT, DELETE /api/v2/historicalFrontendCapacities/{id}
GET, GET BYID, POST, PUT, DELETE /api/v2/historicalObjectiveProtectionCopies
GET, GET BYID, POST, PUT, DELETE /api/v2/historicalObjectiveProtectionCopies/{id}
GET, GET BYID, POST, PUT, DELETE /api/v2/historicalObjectiveProtectionCopySets

GET /api/v2/userGroups
GET /api/v2/userGroups/{userGroupId}
GET /api/v2/users
GET /api/v2/users/{userId}
GET /api/v2/whitelist
GET /api/v2/whitelist/automatic
GET /api/v2/whitelist/csv
GET /api/v2/whitelist/{id}
GET /api/v2/complianceDetails
GET /api/v2/assetComplianceDetails
GET /api/v2/assetProtectionDetails
GET /api/v2/historicalComplianceAssetResults
GET /api/v2/historicalComplianceAssetResults/{id}
GET /api/v2/historicalComplianceMetrics
GET /api/v2/historicalComplianceMetrics/details/assets
GET /api/v2/historicalComplianceMetrics/details/assets/{id}
GET /api/v2/historicalComplianceMetrics/details/plans
GET /api/v2/historicalComplianceMetrics/details/plans/{id}
GET /api/v2/historicalDiscoveryMetrics
GET /api/v2/historicalDiscoveryMetrics/{id}
GET /api/v2/historicalFrontendCapacities
GET /api/v2/historicalFrontendCapacities/{id}
GET /api/v2/historicalObjectiveProtectionCopies
GET /api/v2/historicalObjectiveProtectionCopies/{id}
GET /api/v2/historicalObjectiveProtectionCopySets
```

FIG. 3B

& # METHOD, DEVICE AND COMPUTER PROGRAM PRODUCT FOR MANAGING CACHE BASED ON MATCHING API

CROSS-REFERENCE TO RELATED APPLICATION

This patent application claims priority, under 35 U.S.C. § 119, of Chinese Patent Application No. 202010014669.1, filed Jan. 7, 2020, which is incorporated by reference in its entirety.

FIELD

Embodiments of the present disclosure generally relate to the field of information processing, and more specifically to a method, device and computer program product for managing a cache.

BACKGROUND

Currently, there are many solutions that use a cache to improve system performance. However, these solutions have the following common drawbacks: first, a reserved cache is employed. However, the reserved cache itself needs to occupy memory. The more memory the cache occupies, the less memory is left for use by the system. In addition, maintaining the cache status and keeping its accuracy and consistency are complicated, which easily lead to issues of memory management. Secondly, it remains unknown which data needs to be cached when the system is running. Therefore, engineers are required to predictively identify hot data of their work flow and then store these hot data in the cache. However, the engineers' prediction relies entirely on their industrial experiences, which is probably inaccurate.

SUMMARY

Embodiments of the present disclosure provide a method, device and computer program product for managing a cache.

In a first aspect of the present disclosure, there is provided a method of managing a cache. The method comprises: receiving a current operation request from a user, data requested by the current operation request being to be duplicated to the cache; obtaining a plurality of historical operation requests of the user, the plurality of historical operation requests being received prior to the current operation request; determining a predicted operation request for the user based on the plurality of historical operation requests and the current operation request; and in accordance with determining that a type of an operation associated with the predicted operation request belongs to predetermined types, adjusting data in the cache based on the predicted operation request.

In a second aspect of the present disclosure, there is provided an electronic device. The device comprises: at least one processing unit; and at least one memory coupled to the at least one processing unit and storing instructions executed by the at least one processing unit, the instructions, when executed by the at least one processing unit, causing the device to execute acts, the acts comprising: receiving a current operation request from a user, data requested by the current operation request being to be duplicated to the cache; obtaining a plurality of historical operation requests of the user, the plurality of historical operation requests being received prior to the current operation request; determining a predicted operation request for the user based on the plurality of historical operation requests and the current operation request; and in accordance with determining that a type of an operation associated with the predicted operation request belongs to predetermined types, adjusting data in the cache based on the predicted operation request.

In a third aspect of the present disclosure, there is provided a computer program product. The computer program product is tangibly stored on a non-transitory computer storage medium and comprises machine-executable instructions. The machine-executable instructions, when executed by a device, cause the device to execute any step of the method as described according to the first aspect of the present disclosure.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

The above and other objectives, features and advantages of the present disclosure will become more apparent, through the following detailed description on the example embodiments of the present disclosure with reference to the accompanying drawings in which the same reference symbols refer to the same components.

FIGS. 3A and 3B illustrate a schematic diagram of an API list before and after marking a range of names according to embodiments of the present disclosure, respectively;

Throughout the drawings, the same or similar reference symbols refer to the same or similar elements.

DETAILED DESCRIPTION OF EMBODIMENTS

Figure 1:
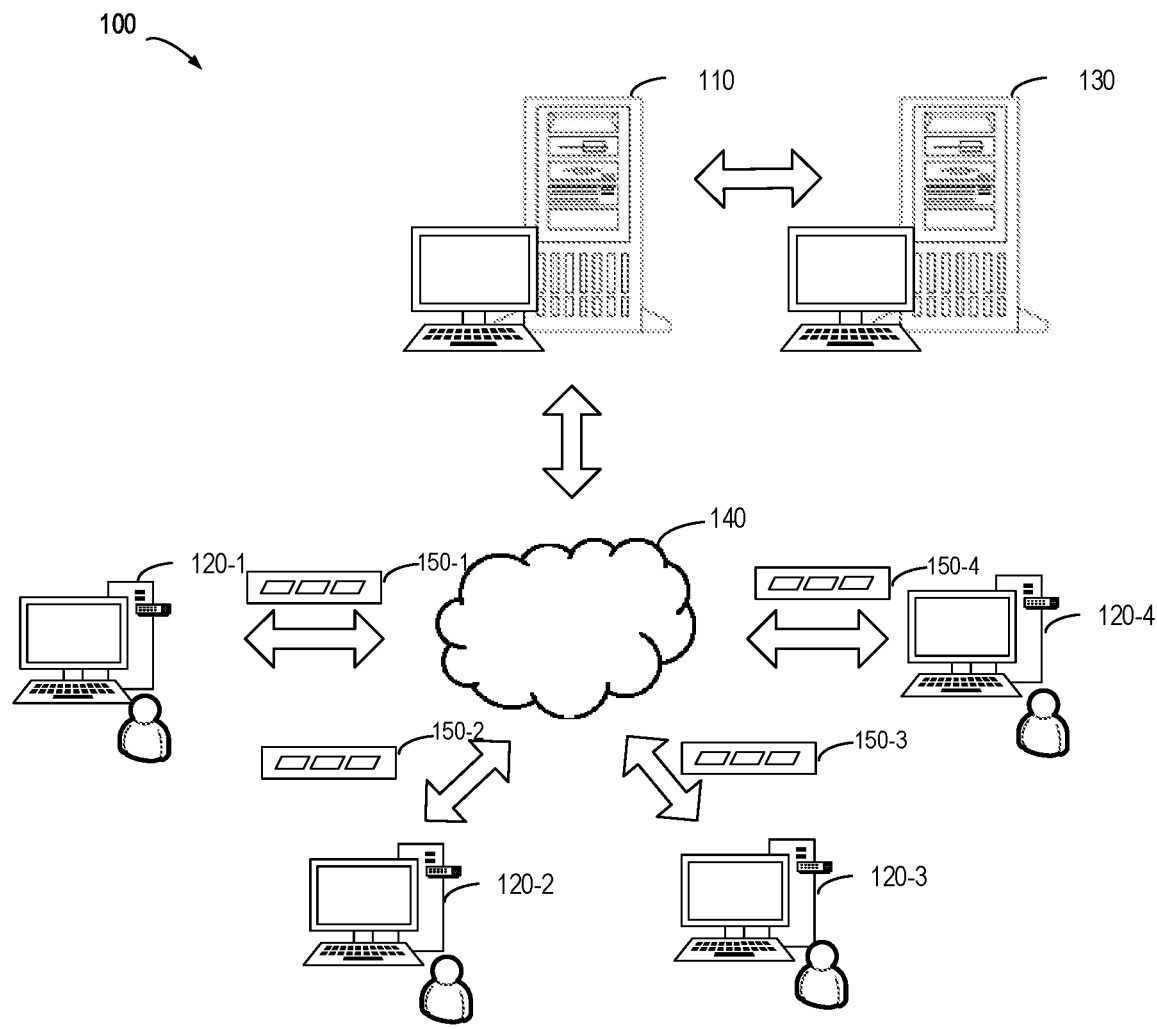
FIG. 1 illustrates a block diagram of an example cache managing system in which embodiments of the present disclosure can be implemented therein.

Preferred embodiments of the present disclosure will now be described in more detail with reference to the drawings.

Although the preferred embodiments of the present disclosure are illustrated in the drawings, it would be appreciated that the present disclosure may be implemented in various manners but cannot be limited by the embodiments as described herein. Rather, these embodiments are provided to disclose the present disclosure more thoroughly and completely, and to convey the scope of the present disclosure fully to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example embodiment" and "an embodiment" are to be read as "at least one example embodiment." The term "another embodiment" is to be read as "at least one other embodiment." The terms "first," "second," and the like may refer to different or same objects. Other definitions, explicit and implicit, may be included below.

As aforementioned, there are many solutions that use a cache to improve system performance, from pure memory cache to memory/disk combined cache. However, these solutions have the following common drawbacks:

First, a reserved cache is employed. When a reserved cache is employed, some page replacement algorithms, such as a Least Recently Used replacement algorithm (LRU), a Least Frequently Used replacement algorithm (LFU), and the like, are usually used for managing a cache, so as to improve the system performance. However, the limitation lies in that the reserved cache itself needs to occupy memory and it occupies a large portion of memory when the cache grows larger. The more memory the cache occupies, the less memory is left for use of the system, causing the system performance to deteriorate. In addition, maintaining the cache status and keeping its accuracy and consistency are complicated, which easily leads to issues of memory management (e.g., out of memory, data inconsistency, and the like).

Secondly, it remains unknown which data need to be cached when the system is running. Therefore, engineers are required to predictively identify hot data of their work flow, that is, the engineers need to predict which data will occupy a large portion of the memory when the system is running, and then store these hot data in the cache. However, the engineers' prediction relies entirely on their industrial experience, which is probably inaccurate. Furthermore, since these caches are tightly bound with applications, it is difficult for other applications to reuse these caches.

Embodiments of the present disclosure provide a solution for managing a cache, so as to solve one or more of the above problems and other potential problems. The solution can dynamically cache data in a system based on real historical behavior of the system and real historical behavior of a user, thereby improving the system performance.

FIG. 1 illustrates a block diagram of an example cache managing system 100 in which embodiments of the present disclosure can be implemented therein. As shown in FIG. 1, the cache managing system 100 includes a cache managing device 110, a user device 120-1 to 120-4 (collectively referred to as a user device 120) and a data storage device 130. Various methods according to embodiments of the present disclosure may be implemented at an electronic device such as the cache managing device 110.

As shown in FIG. 1, a user may initiate various operation requests 150-1 to 150-4 (collectively referred to as an operation request 150) via the user device 120. In some embodiments, the operation request may be a request to read or write data stored in the data storage device 130. The cache managing device 110 may receive the various operation requests 150 from the user device 120 via a network 140 connected between the cache managing device 110 and the user device 120. In some embodiments, the cache managing device 110 may receive the operation request 150 via an Application Programming Interface (API). Upon receiving the operation request 150, the cache managing device 110 can provide, according to the received operation request 150, the data stored in the data storage device 130 to the user device 120.

The cache managing device 110 may be, for example, a computer, a virtual machine, a server, and the like. The user device 120 may be a computer, a smart phone, and the like. The data storage device 130 may be a computer, a virtual machine, a server, a magnetic disk, a floppy disk, and the like. The network 140 may be an internet, an intranet, and the like. The present disclosure is not limited in these aspects. In addition, although the cache managing device 110 and the data storage device 130 are shown as separate devices in FIG. 1, the cache managing device 110 and the data storage device 130 may also be integrated into the same device in some embodiments. The present disclosure is not limited in this aspect.

It would be appreciated that, the structure of the cache managing system 100 is described merely as an example, without implying any limitation to the scope of the present disclosure. For example, embodiments of the present disclosure may be applied to a system different than the cache managing system 100. It would be appreciated that the specific number of the devices and operation requests are provided only for illustration, without implying any limitation to the scope of the present disclosure.

Figure 2:
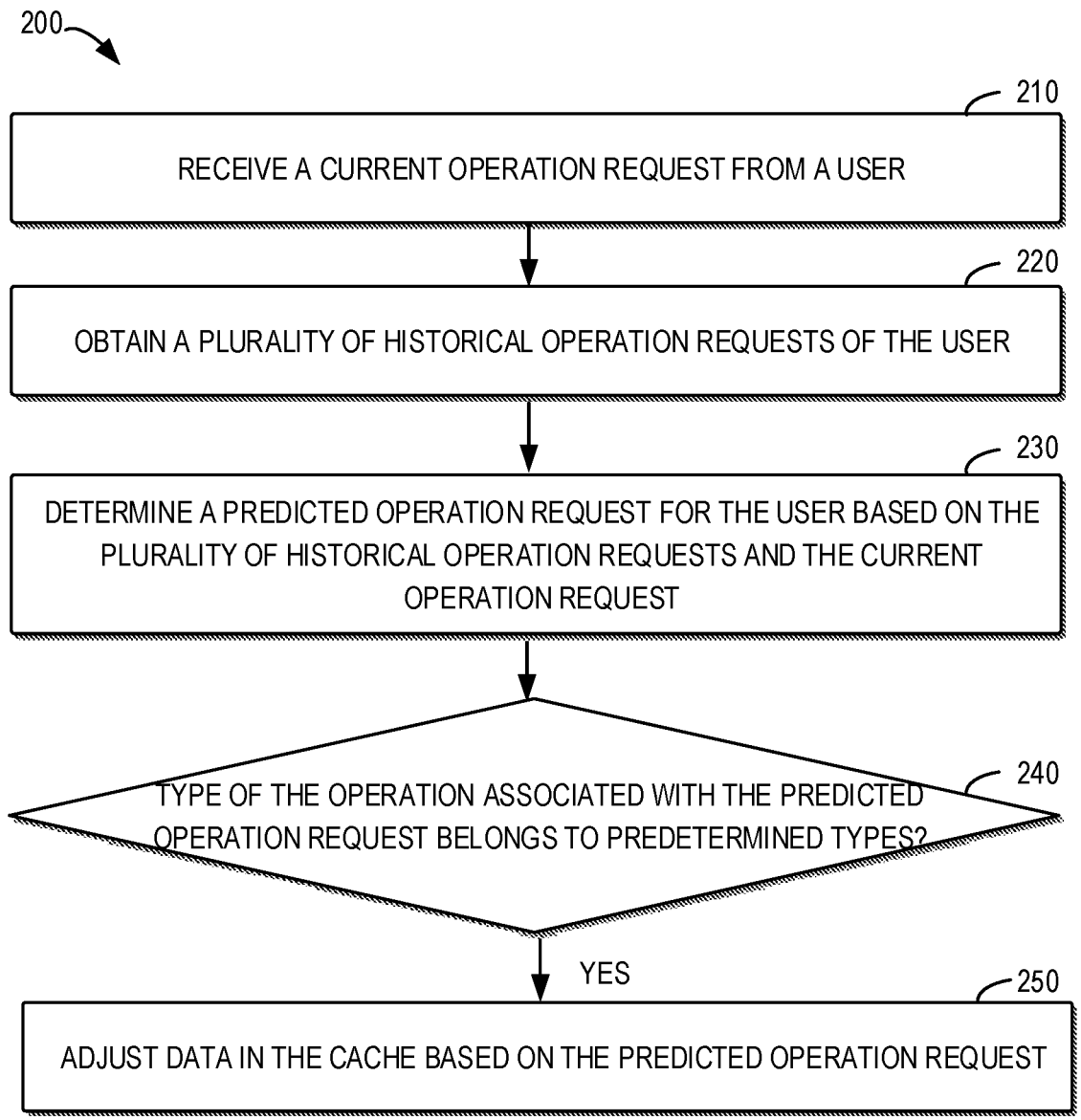
FIG. 2 illustrates a flowchart of an example method of managing a cache according to embodiments of the present disclosure.

FIG. 2 illustrates a flowchart of an example method 200 of managing a cache according to embodiments of the present disclosure. For example, the method 200 may be performed by the cache managing device 110 as shown in FIG. 1. It should be appreciated that the method may be performed by other devices, and the scope of the present disclosure is not limited in this aspect. It should also be understood that the method 200 may include additional acts not shown and/or may skip the acts shown, and the scope of the present disclosure may not be limited in this aspect.

At 210, the cache managing device 110 receives a current operation request from a user.

As described above, in some embodiments, the current operation request may be a request to read or write data stored in the data storage device 130. In addition, in some other embodiments, the cache managing device 110 may receive the current operation request via an Application Programming Interface (API). In the embodiments where the operation request is received via an API, the name of the API can reflect a type of an operation associated with the operation request and a storage location of data requested by the operation request. In addition, in some further embodiments, the current operation request may be an operation request in a Representational State Transfer (REST) format.

Table 1 below shows types of example APIs of the cache managing device according to the embodiments of the present disclosure, via which the user's operation requests can be received.

TABLE 1

| Name of Operation | Type of Operation | Description |
|---|---|---|
| GET | Read | Loading resource |

TABLE 1-continued

| Name of Operation | Type of Operation | Description |
|---|---|---|
| GET by ID | Read | Loading resource by ID |
| POST | Write | Creating new resource |
| PUT | Write | Updating resource |
| DELETE | Write | Deleting resource |
| Others | Write | Other APIs |

At 220, the cache managing device 110 obtains a plurality of historical operation requests of the user.

In some embodiments, the historical operation request may be a request, that has been received by the cache managing device 110, to read or write data stored in the data storage device 130. As described above with respect to 210, in some embodiments, the historical operation request may be received by the cache managing device 110 via the API. In addition, in some embodiments, the historical operation request may be an operation request in the REST format.

In addition or alternatively, in some embodiments, the cache managing device 110 may obtain a plurality of session-based historical operation requests, where the plurality of historical operation requests typically start with login or authorization and end with logout or auto logout due to session timeout.

In some embodiments, for each historical operation request, the cache managing device 110 may obtain a type of an operation associated with the historical operation request, and a storage location of data requested by the historical operation request. In addition, in some other embodiments, the obtaining of this information may be achieved by obtaining the name of the API that receives the historical operation request.

In addition, in some embodiments, for each historical operation request, the cache managing device 110 may obtain the name or role of the user initiating the historical operation request, which is beneficial to cache management as will be described in detail below. Since different users have different habits, their operation may be different even if they are using the same system having the same functions. Obtaining the name of the user allows the cache managing device to dynamically adjust the data in the cache according to the user's habit. The role of the user may be, for example, a system administrator, an export and recovery administrator, a non-administrator user, and the like. A different role indicates that the user has different operation permission to the data. By obtaining the role of the user, a smaller predetermined range of types associated with the user's operations can be obtained, which facilitates improving the accuracy of prediction. Detailed description in this aspect will be provided below. In addition, in some other embodiments, the cache managing device 110 may obtain an identifier of the session between the user and the cache managing device 110, to identify the interaction between the user and the cache managing device 110.

In addition, in some further embodiments, for each historical operation request, the cache managing device 110 may obtain a timestamp when the historical operation request was received (sometimes referred to as "start time" of the operation request herein). In addition or alternatively, the cache managing device 110 may obtain a timestamp when data requested by the historical operation request was provided to the user (sometimes referred to as "end time" of the operation request herein). With the two timestamps, the cache managing device 110 may compute the time duration needed for processing a single operation request, and may also compute the average time duration needed for processing operation requests over a period of time.

The information obtained with respect to each historical operation request as descried above may also be referred to as "metadata." Table 2 below shows example metadata of a plurality of historical operation requests according to embodiments of the present disclosure.

TABLE 2

| Name of API | Start Time | End Time | Name of User | Role of User | Session ID |
|---|---|---|---|---|---|
| GET /api/v2/user | 2019 Apr. 11 09:16:41.535 | 2019 Apr. 11 09:16:42.155 | Lucy | Admin | abc-123-sss |
| POST /api/v2/sla | 2019 Apr. 11 09:16:41.115 | 2019 Apr. 11 09:16:42.155 | Lucy | Admin | abc-123-sss |
| POST /api/v2/schedule | ... | ... | ... | ... | ... |
| GET /api/v2/assets | ... | ... | ... | ... | ... |
| POST /api/v2/plc | ... | ... | ... | ... | ... |
| GET /api/v2/job | ... | ... | ... | ... | ... |
| GET /api/v2/task | ... | ... | ... | ... | ... |

It should be appreciated that information related to the historical operation request is provided only as an example, without implying any limitation to the scope of the present disclosure. For example, the information related to the historical operation request may also include other information. The present disclosure is not limited in this aspect.

At 230, the cache managing device 110 determines a predicted operation request for the user based on the plurality of historical operation requests and the current operation request.

In some embodiments, the cache managing device 110 determines the predicted operation request for the user at the same time as the current operation request is being processed. In other words, before the occurrence of the subsequent operation request of the user, the cache managing device 110 predicts the subsequent operation request for the user. In some embodiments, the cache managing device 110 may determine a type of an operation associated with the predicted operation request and a storage location of data requested by the predicted operation request. Since the subsequent operation request is derived based on the historical operation requests of the user, the user's behavior habit is taken into account. Details about how the predicted operation request for the user is determined will be described below with reference to FIG. 4.

At 240, the cache managing device 110 determines whether the type of the operation associated with the predicted operation request belongs to predetermined types.

The cache managing device 110 will operate data in the system according to the predicted operation request, and meanwhile, it is not desired to impact the existing data in the system. As a result, not all types of operations are suitable for the subsequent pre-caching process. In some embodiments, the cache managing device 110 only performs the subsequent pre-caching process according to the "read" type of operations, because the "read" type of operations are idempotent, i.e., they can be performed multiple times, without changing the existing data.

In addition, in some embodiments, since the name of the API via which the operation request is received is associated with the type of operation of the operation request, the cache managing device 110 may mark a range of API names in advance, which facilitates determining whether the type of the operation associated with the predicted operation request belongs to the predetermined types. Take Table 1 described above as an example, all APIs of the GET type or GET by ID type may be marked in advance. Only when the predicted operation request is related to the marked API, the cache managing device 110 performs the subsequent pre-caching process. In addition, in some embodiments, a part of APIs of the GET type are not idempotent. In such embodiments, these non-idempotent APIs may be marked out of the predetermined types.

FIG. 3A illustrates a schematic diagram of an API list before marking a range of names, according to embodiments of the present disclosure. As shown in FIG. 3A, 310 shows an example API list before marking a range of names. It can be seen that the API list 310 covers APIs of various operation types listed in the Table 1.

FIG. 3B illustrates a schematic diagram of an API list after marking a range of names, according to embodiments of the present disclosure. As shown in FIG. 3B, 320 shows an example API list after marking a range of names. It can be seen that the API list 320 only includes APIs of the GET type. In those embodiments, the cache managing device 110 may determine whether the predicted operation request is associated with an API in the API list with the range of names marked.

It would be appreciated that the API list is only provided as an example, without implying any limitation to the scope of the present disclosure. For example, the API list may also include APIs of other types or names, and the API list may cover more or fewer APIs. The present disclosure is not limited in this aspect.

Returning now to FIG. 2, if the cache managing device 110 determines at 240 that the type of the operation associated with the predicted operation request belongs to the predetermined types, for example, the operation associated with the predicted operation request is a read operation, the cache managing device 110 adjusts at 250 data in the cache based on the predicted operation request.

In some embodiments, the cache managing device 110 duplicates data requested by the predicted operation request from the data storage device 130 to the cache in the cache managing device 110. Then, once a subsequent operation request initiated by the user immediately after the current operation request is received, the data in the cache can be provided directly to the user if it is determined that the subsequent operation request is consistent with the predicted operation request, without waiting to search and duplicate data after the reception of the subsequent operation request. In this way, the data can be provided to the user more quickly, in other words, the time for processing the operation request can be reduced.

In addition, in some other embodiments, since the data requested by the subsequent operation request from the user is pre-stored in the cache based on the historical operation requests of the user, the data associated with the subsequent operation request can be deleted directly from the cache after determining that the data requested by the subsequent operation request have been provided to the user, rather than being reserved in the cache as in the traditional method of managing cache. Or, if it is determined that the subsequent operation request initiated by the user is inconsistent with the predicted operation request, the data associated with the predicted operation request can also be deleted from the cache, and then the data requested by the subsequent operation request are searched from the data storage device 130. In this way, irrespective of whether the data in the cache was provided to the user, the data in the cache are deleted in time, thereby reducing the memory space occupied by the cache.

In addition, in some embodiments, the cache managing device 110 may wait for a period of delay time and then duplicate the data requested by the predicted operation request from the data storage device 130 to the cache in the cache managing device 110. That is because the data in the data storage device 130 may vary with time, and in order to obtain the latest data corresponding to the subsequent operation request initiated by the user, a duplication delay corresponding to the predicted operation request may be determined based on start time and end time of respective historical operation requests, and then the duplication of the data requested by the predicted operation request may be started at the time of the duplication delay after the time point when the predicted operation request was determined.

In the above example embodiments, it can be determined dynamically and intelligently which data should be cached before the user needs the data, by determining the predicted operation request for the user based on the historical operation requests of the user, and then adjusting the data in the cache based on the predicted operation request, thereby increasing the speed of processing the operation requests of the user. Moreover, since the data associated with the predicted operation request in the cache are deleted in time, the memory space occupied by the cache can be reduced, thereby improving the system performance.

Figure 4:
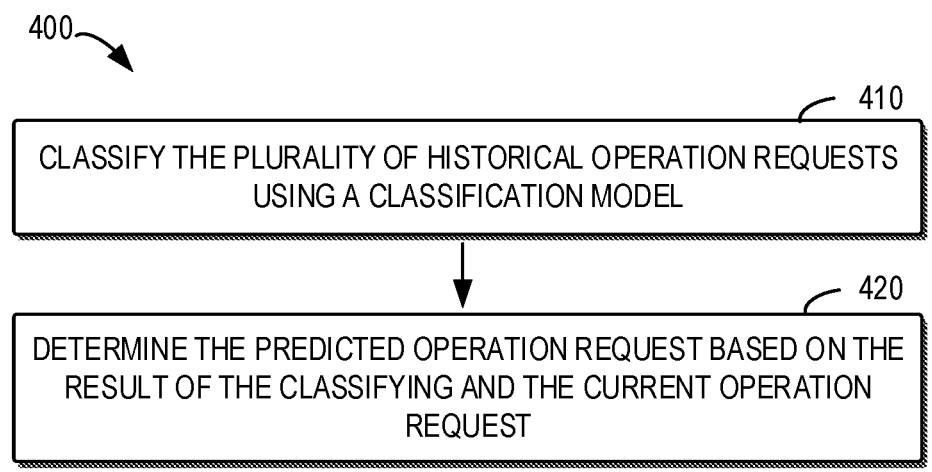
FIG. 4 illustrates a flowchart of a method of determining a predicted operation request for a user according to embodiments of the present disclosure.

FIG. 4 illustrates a flowchart of a method 400 of determining a predicted operation request for a user according to embodiments of the present disclosure. The method 400 is an embodiment of 230 in the method 200. For example, the method 400 may be performed by the cache managing device 110 as shown in FIG. 1. It should be appreciated that the method 400 may be performed by other devices, and the scope of the present disclosure is not limited in this aspect. It should also be understood that the method 400 may include additional acts not shown and/or skip the acts shown, and the scope of the present disclosure is not limited in this aspect.

At 410, the cache managing device 110 classifies the plurality of historical operation requests using a classification model.

In some embodiments, the cache managing device 110 may classify the plurality of historical operation requests using a KNN (K-Nearest Neighbor) classification algorithm. For example, the cache managing device 110 may sort the plurality of historical operation requests according to receiving time points of the plurality of historical operation requests.

Figure 5A:
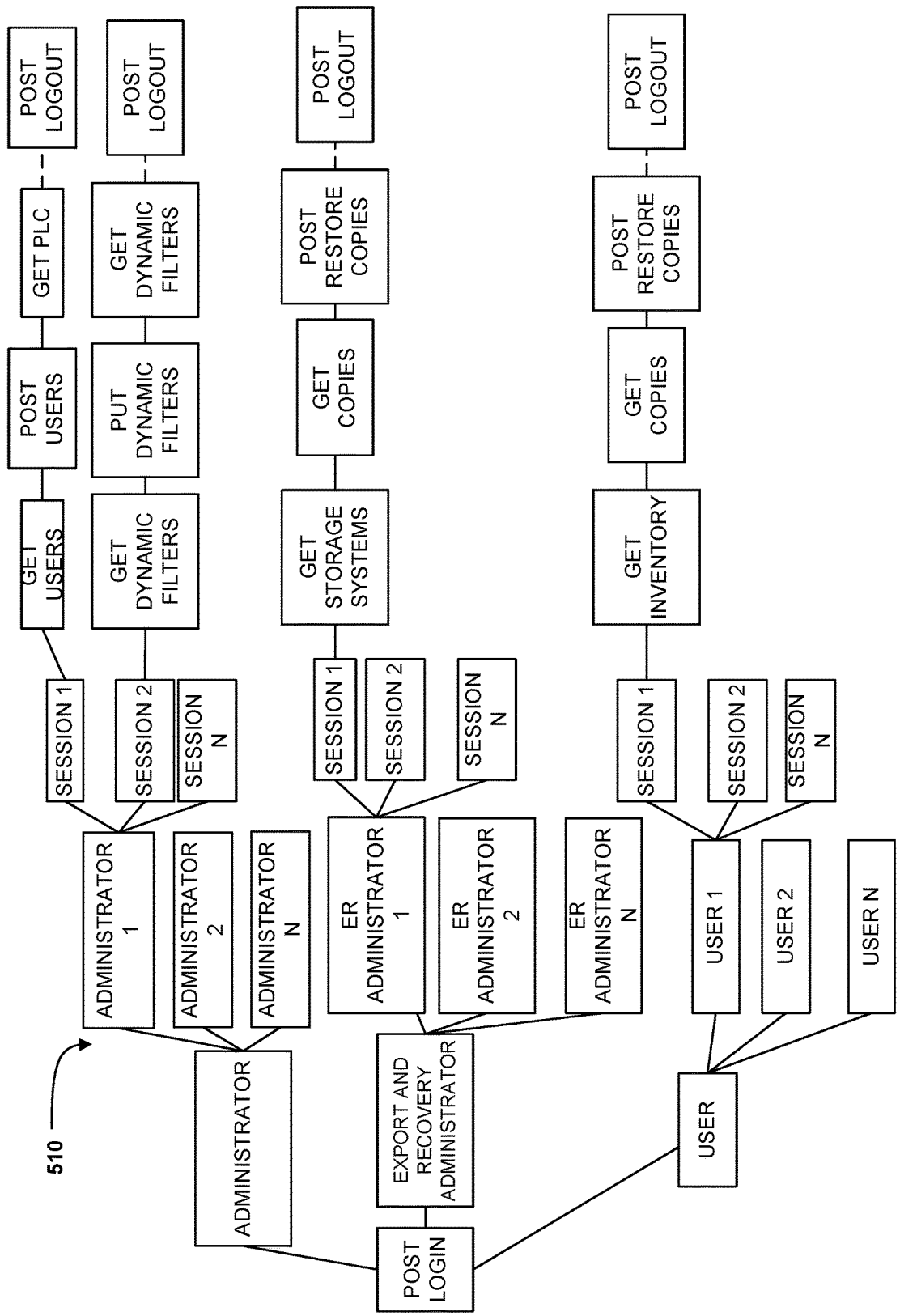
FIG. 5A illustrates a schematic diagram of a plurality of historical operation requests from a plurality of sessions according to embodiments of the present disclosure.
Figure 5B:
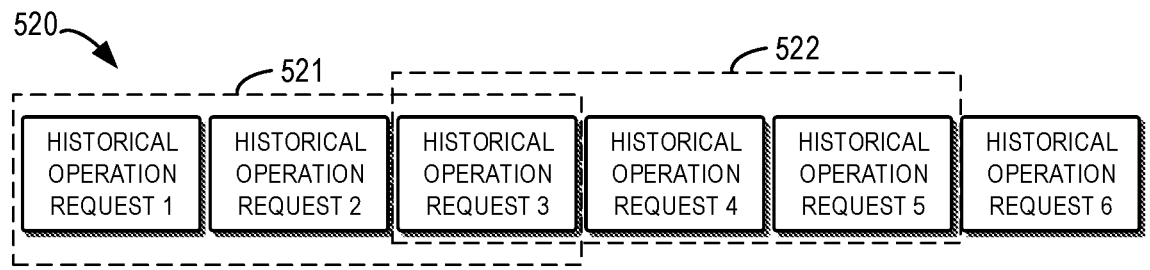
FIG. 5B illustrates a schematic diagram of an example of a sorted plurality of historical operation requests according to embodiments of the present disclosure.

FIG. 5A illustrates a schematic diagram of a plurality of historical operation requests from a plurality of sessions according to embodiments of the present disclosure. FIG. 5B illustrates a schematic diagram of an example of a sorted plurality of historical operation requests according to embodiments of the present disclosure. Table 3 below shows several examples of a sorted plurality of historical operation requests according to embodiments of the present disclosure.

TABLE 3

| No. | Sorted Historical Operation Requests |
|---|---|
| 1 | POST/login->GET/user->POST/user->GET/PLC . . . ->POST/logout |
| 2 | POST/login->GET/plc->GET/schedule->GET/assets . . . ->POST/logout |

TABLE 3-continued

| No. | Sorted Historical Operation Requests |
|---|---|
| 3 | POST/login->GET/rule->PUT/rule->GET/rule . . . ->POST/logout |
| 4 | POST/login->GET/logs->DELETE/logs->GET/log . . . ->POST/logout |

It should be appreciated that several examples of a sorted plurality of historical operation requests are provided only for illustration, without implying any limitation to the scope of the present disclosure. For example, the sorted historical operation requests may include other operation requests, and the sorted historical operation requests may also follow other orders. The present disclosure is not limited in this aspect.

In some embodiments, the cache managing device 110 may map the sorted historical operation requests to a plurality of coordinate points in a coordinate system, and each coordinate point corresponds to a predetermined number of the sorted historical operation requests. For example, as shown in FIG. 5B, among the received 6 historical operation requests, every 3 sorted historical operation requests are mapped to one coordinate point in the coordinate system. In FIG. 5B, 521 and 522 correspond to a coordinate point, respectively. The sorted historical operation requests corresponding to 521 and 522 are also referred to as "sample". The number of sorted historical operation requests corresponding to each sample may be predetermined. The predetermined number may also be referred to as "window length." For example, if the window length is k, n-k (k<n) samples may be obtained for n historical operation requests.

In some embodiments, in order to map the sorted historical operation requests to a coordinate space, some parameters may be used to represent these samples. For example, each sample is represented by {"a combination of operation requests," "name of user," "role of user"}. Thereafter, the combination of parameters is mapped to the coordinate space using a consistent hashing method. For historical operation requests, since a subsequent historical operation request of each sample is known, the subsequent historical operation request may be regarded as the category of the sample. As shown in FIG. 5B, the historical operation request 4 may represent the category of the sample 521, and the historical operation request 6 may represent the category of the sample 522. Table 4 below illustrates several example sample coordinate points and categories thereof according to embodiments of the present disclosure.

TABLE 4

| Sample Coordinate Point | Category |
|---|---|
| {99, 22, 2} | /user |
| {99, 22, 2} | /user |
| {99, 22, 2} | /user |
| {56, 21, 20} | /plc |

It should be appreciated that FIG. 5 and Table 4 are provided only for the purpose of illustration, without implying any limitation to the scope of the present disclosure. For example, the sorted historical operation requests may include more or fewer historical operation requests; the classification model employed may use a larger or smaller window length; and the parameter combination for each sample may also be other combinations, and the like. The present disclosure is not limited in those aspects.

Returning now to FIG. 4, at 420, the cache managing device 110 determines the predicted operation request based on the result of the classifying and the current operation request.

In some embodiments, for the current operation request received, the cache managing device 110 may map it to the coordinate system using a similar method as described above with respect to FIG. 5. For example, according to the embodiments as shown in FIG. 5, the predetermined number is 3, i.e., the window length is 3, then the current operation request and 2 prior historical operation requests are mapped as a combination to a first coordinate point in the coordinate system. Then, distances between the first coordinate point and a plurality of coordinate points obtained from the plurality of historical operation requests are computed respectively, the coordinate point having the shortest distance with the first coordinate point is determined as a historical operation request matching the current operation request, and the subsequent historical operation request of the matching historical operation request is determined as the predicted operation request.

Alternatively, in some other embodiments, the "majority voting" principle may be adopted, where N coordinate points closest to the first coordinate point are determined from a plurality of coordinate points, and then the category corresponding to the majority of the N coordinate points is determined as the category of the first coordinate point, i.e., the category is determined as the predicted operation request.

Figure 6:
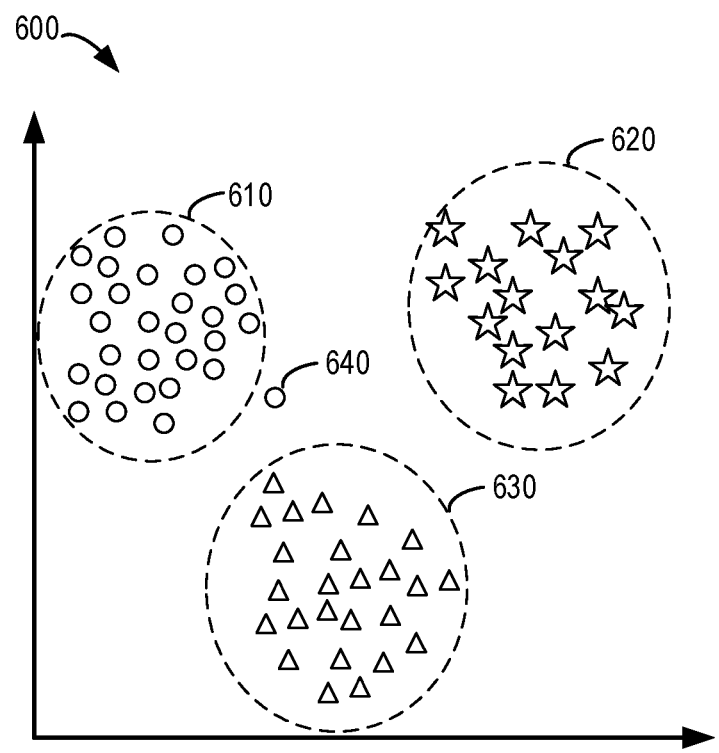
FIG. 6 illustrates a schematic diagram of a coordinate system into which a plurality of historical operation requests and a current operation request are mapped, according to embodiments of the present disclosure.

FIG. 6 illustrates a schematic diagram of a coordinate system into which a plurality of historical operation requests and a current operation request are mapped, according to embodiments of the present disclosure.

As shown in FIG. 6, circles, stars and triangles in 610, 620 and 630 represent a plurality of historical operation requests mapped to the coordinate system, and 610, 620 and 630 indicate different categories, namely different subsequent historical operation requests, respectively. 640 represents the current operation request mapped to the coordinate system. From a distance calculation, it can be determined that 640 is closest to a circle in 610, or most of N coordinate points closest to 640 belong to 610, then 640 will be determined as belonging to 610, i.e., the subsequent historical operation request of the circle in 610 is determined as the predicted operation request.

In the above example embodiments, predicting the subsequent operation request for the user may be achieved by classifying the plurality of historical operation requests using a classification algorithm and then determining the category of the current operation request, thereby making it possible to adjust the data in the cache based on the predicted operation request.

Figure 7:
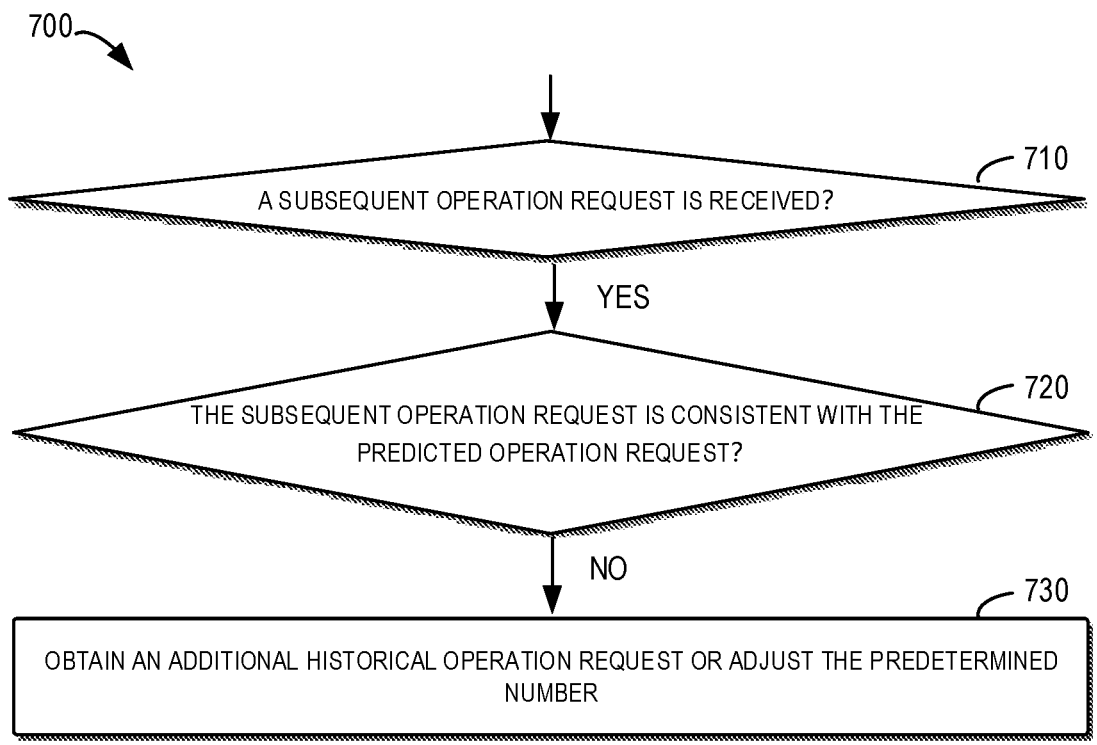
FIG. 7 illustrates a flowchart of an example method of adjusting prediction parameters according to embodiments of the present disclosure.

FIG. 7 illustrates a flowchart of an example method 700 of adjusting a prediction parameter according to embodiments of the present disclosure. The method 700 is an additional embodiment of 410 in the method 400.

At 710, the cache managing device 110 determines whether a subsequent operation request immediately after the current operation request is received from the user. Upon receiving the subsequent operation request, the cache managing device 110 determines at 720 whether the subsequent operation request is consistent with the predicted operation request.

In some embodiments, the cache managing device 110 may monitor over a period of time whether the predicted operation request determined is consistent with the subsequent operation request actually initiated by the user, and then compute prediction accuracy in the period of time. For example, if m predictions are performed in total in the period of time and inconsistency occurs e times, the accuracy is determined as 1-e/m. The value of the accuracy is between 0 and 1.

If the subsequent operation request is inconsistent with the predicted operation request, the cache managing device 110 obtains at 730 an additional historical operation request or adjusts the predetermined number.

In some embodiments, if the value of the accuracy is below a predetermined threshold, for example, below 0.8, the cache management 110 adjusts the predetermined number, namely the window length used in the classification process as mentioned above. For example, the window length can be increased.

Alternatively or additionally, in some other embodiments, if the value of the accuracy is below the predetermined threshold, the cache managing device 110 may obtain an additional historical operation request. Considering that the operation habit of a user may vary with time, if prediction within a period of time is not accurate enough, the prediction may be performed after obtaining more historical operation requests.

Alternatively or additionally, in some further embodiments, if the value of the accuracy is decreasing, the cache managing device 110 also considers that it is inconsistent with the predicted operation request, then the cache managing device 110 may obtain more historical operation requests or adjust the predetermined number.

Figure 8A:
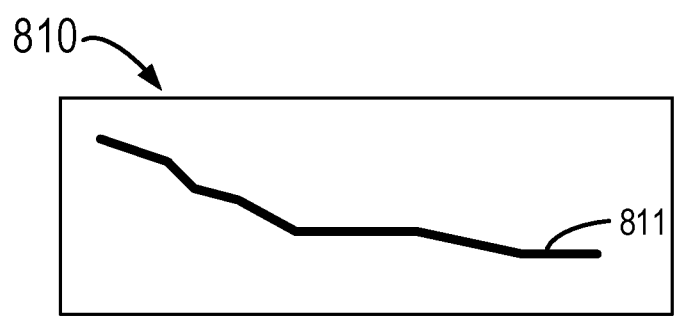
FIGS. 8A and 8B illustrate a schematic diagram of a curve of prediction accuracy according to embodiments of the present disclosure, respectively.
Figure 8B:
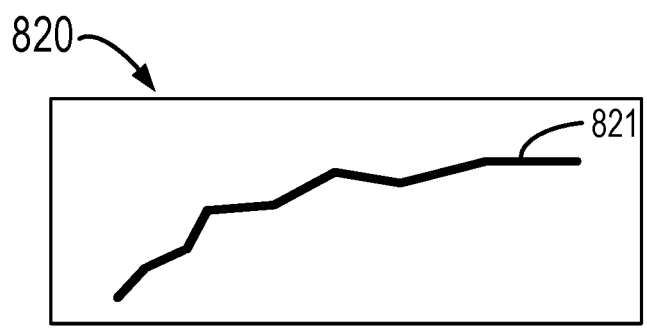

FIGS. 8A and 8B illustrate a curve of prediction accuracy according to embodiments of the present disclosure, respectively. FIG. 8A illustrates a situation where the prediction accuracy is increasing. In this situation, it is unnecessary for the cache managing device 110 to adjust prediction parameters. FIG. 8B illustrates a situation where the prediction accuracy is decreasing. In this situation, the cache managing device 110 needs to adjust the prediction parameters, for example, by obtaining more historical operation requests or increasing the window length in the prediction process.

In the above example embodiments, parameters involved in the prediction process can be adjusted dynamically based on the accuracy by monitoring whether the prediction is accurate, thereby ensuring high accuracy of the prediction.

Figure 9:
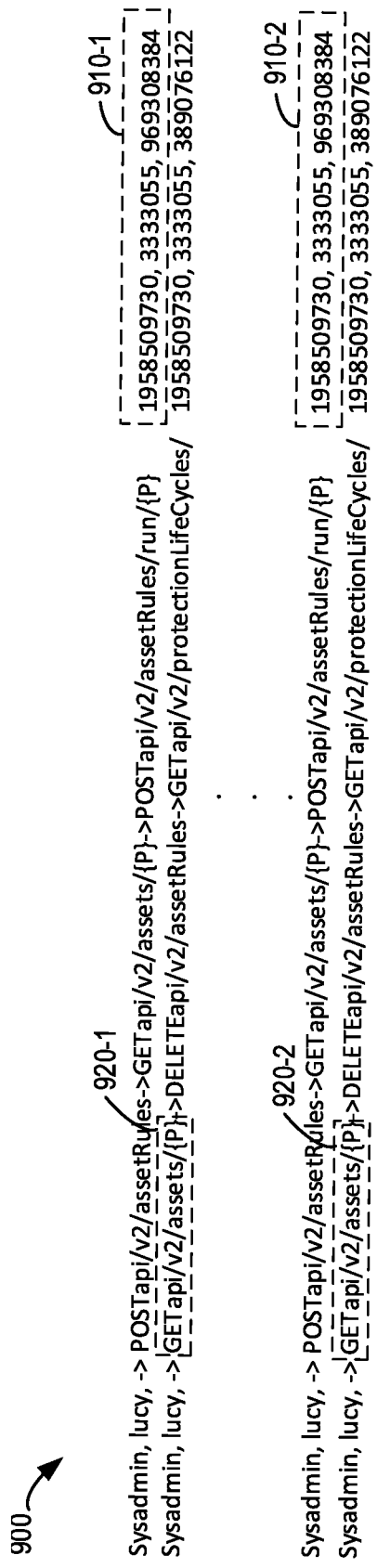
FIG. 9 illustrates a schematic diagram of a list of a predetermined number of sorted historical operation requests according to embodiments of the present disclosure.

FIG. 9 illustrates a schematic diagram of a list 900 of a predetermined number of sorted historical operation requests according to embodiments of the present disclosure.

In the example as shown in FIG. 9, the window length is set to 3, therefore each row has 3 sorted historical operation requests. 910-1 and 910-2 show respective values of coordinate points corresponding to the 3 sorted historical operation requests (i.e., the sample). 920-1 and 920-2 show a subsequent operation request, respectively. Actually, after the sorted historical operation requests have been mapped to the coordinate space, a behavior pattern of the current user can be observed by browsing the list.

Table 5 below schematically illustrates information, values of coordinate points and categories related to various samples according to embodiments of the present disclosure.

TABLE 5

| Predetermined Number of Sorted Historical Operation Requests | Name of User | Role of User | Value of Coordinate Point | Category |
| --- | --- | --- | --- | --- |
| GETapi/v2/assets/{P}-> POSTapi/v2/assetRules/run/{P}-> GETapi/v2/assets/{P} | Lucy | sysadmin | {1958509730, 3333055, −490477015} | GET/PLC |
| . . . | Lily | admin | . . . | GET/OOP |
| . . . | . . . | . . . | . . . | GET/userlist |
| . . . | . . . | . . . | . . . | GET/userlist |
| POSTapi/v2/assetRules/run/{P}-> GETapi/v2/assets/{P}-> DELETEapi/v2/assetRules/{ID} | Lucy | sysadmin | {1958509730, 3333055, −335168493} | GET/PLC |
| . . . | . . . | . . . | . . . | GET/userlist |

Upon receiving the current operation request, after computation, it is determined that the first coordinate point in the coordinate system to which the current operation request is mapped is {1958509730, 3333055, −490477015}. After computing its distances with other coordinate points and performing statistics on categories of the closet 200 coordinate points, the following statistical results are obtained: 150 coordinate points belong to GET/PLC, 45 coordinate points belong to GET/assets, and 5 coordinate points belong to GET/userlist. Therefore, the predicted operation request is determined as GET/PLC.

It should be appreciated that the above process is provided merely as an example, without implying any limitation to the scope of the present disclosure. For example, the operation requests, names of user, roles of user, values of coordinate points, and categories as shown in the above process may be other operation requests, names of user, roles of users, values of coordinate points, and categories. The present disclosure is not limited in this aspect.

Figure 10:
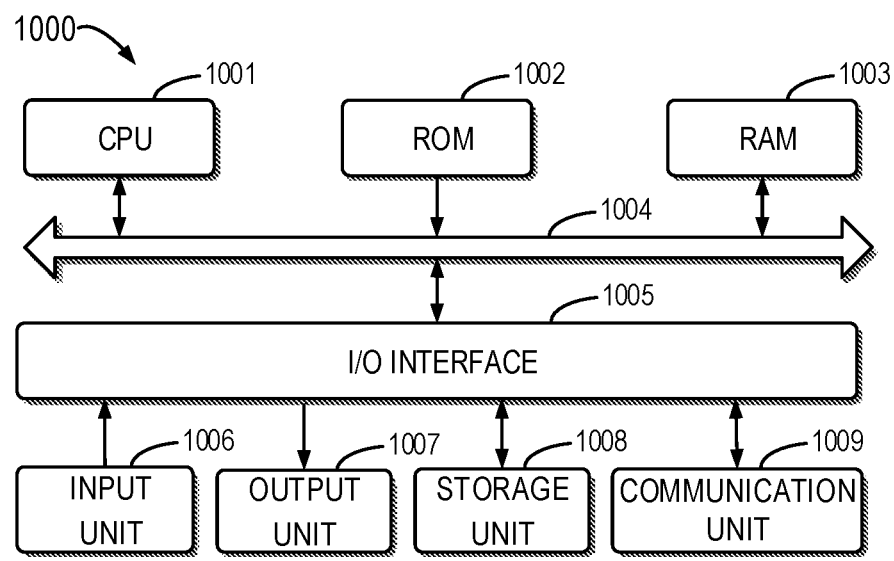
FIG. 10 illustrates a schematic block diagram of an example device that can be used to implement embodiments of the present disclosure.

FIG. 10 illustrates a schematic block diagram of an example electronic device 1000 that can be used to implement embodiments of the present disclosure. For example, the cache managing device 110 as shown in FIG. 1 may be implemented by the device 1000. As shown therein, the device 1000 includes a central processing unit (CPU) 1001 which performs various appropriate acts and processing, based on computer program instructions stored in a read-only memory (ROM) 1002 or computer program instructions loaded from a storage unit 1008 to a random access memory (RAM) 1003. The memory 1003 stores therein various programs and data required for operations of the device 1000. The CPU 1001, the ROM 1002 and the memory 1003 are connected via a bus 504 with one another. An input/output (I/O) interface 1005 is also connected to the bus 1004.

The following components in the device 1000 are connected to the I/O interface 1005: an input unit 1006 such as a keyboard, a mouse and the like; an output unit 1007 including various kinds of displays and a loudspeaker, etc.; a storage unit 1008 such as a magnetic disk, an optical disk, and etc.; a communication unit 1009 including a network card, a modem, and a wireless communication transceiver, etc. The communication unit 1009 allows the device 1000 to exchange information/data with other devices through a computer network such as the Internet and/or various kinds of telecommunications networks.

Various processes and processing described above, e.g., the methods 200, 400 and 700, may be executed by the processing unit 1001. For example, in some embodiments, the methods 200, 400 and 700 may be implemented as a computer software program that is tangibly included in a machine-readable medium, e.g., the storage unit 1008. In some embodiments, part or all of the computer programs may be loaded and/or mounted onto the device 1000 via ROM 1002 and/or communication unit 1009. When the computer program is loaded to the RAM 1003 and executed by the CPU 1001, one or more acts of the methods 200, 400 and 700 as described above may be executed.

The present disclosure may be a method, device, system, and/or computer program product. The computer program product may include a computer-readable storage medium having computer-readable program instructions thereon for carrying out aspects of the present disclosure.

The computer-readable storage medium may be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals sent through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA), may execute the computer-readable program instructions by utilizing state information of the computer-readable program instructions to personalize the electronic circuitry, in order to perform aspects of the present disclosure.

Aspects of the present disclosure are described herein with reference to flowchart illustrations and/or block diagrams of methods, device (systems), and computer program products according to embodiments of the disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor unit of a general purpose computer, special purpose computer, or other programmable data processing device to produce a machine, such that the instructions, when executed via the processing unit of the computer or other programmable data processing device, create means for implementing the functions/acts specified in the flowchart and/or block diagram block or blocks. These computer-readable program instructions may also be stored in a computer-readable storage medium that can direct a computer, a programmable data processing device, and/or other devices to function in a particular manner, such that the computer-readable storage medium having instructions stored therein includes an article of manufacture including instructions which implement aspects of the functions/actions specified in the flowchart and/or block diagram block or blocks.

The computer-readable program instructions may also be loaded onto a computer, other programmable data processing device, or other devices to cause a series of operational steps to be performed on the computer, other programmable devices or other devices to produce a computer implemented process, such that the instructions which are executed on the computer, other programmable device, or other devices implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which includes one or more executable instructions for implementing the specified logical function(s). In some alternative implementations, the functions noted in the block may occur out of the order noted in the figures. For example, two blocks in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those skilled in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method of managing a cache, comprising:
   receiving a current operation request from a user via an Application Programming Interface (API), wherein data, requested by the current operation request, is to be duplicated to the cache, and a name of the API indicating i) a type of an operation associated with the current operation request and ii) a storage location of the data requested by the current operation request;
   obtaining a plurality of historical operation requests of the user, the plurality of historical operation requests being received prior to the current operation request;
   determining a predicted operation request for the user based on the plurality of historical operation requests and the current operation request;
   marking, based on the name of the API indicating the type of the operation associated with the current operation request, a range of API names in advance;
   determining whether a first type, of a first operation associated with the predicted operation request, belongs to predetermined types, the determining whether the first type belongs to predetermined types comprises:
      determining that the predicted operation request is associated with one of the marked range of API names;
   and in response to determining that the predicted operation request is associated with the one of the marked range of the API names, adjusting data in the cache based on predicted operation request.

2. The method of claim 1, wherein obtaining the plurality of historical operation
   requests of the user comprises obtaining at least one of the following:
   a name of the user, a role of the user, an identifier of a session initiated by the user, a timestamp when a historical operation request was received, a timestamp when data requested by a historical operation request was provided to the user, a type of an operation associated with a historical operation request, and a storage location of data requested by a historical operation request.

3. The method of claim 1, wherein determining the predicted operation request for the user comprises determining
   a storage location of data requested by the predicted operation request.

4. The method of claim 1, wherein determining the predicted operation request for the user comprises:
   classifying the plurality of historical operation requests using a classification model, a result of the classifying indicating a subsequent historical operation request of each of the plurality of historical operation requests; and
   determining the predicted operation request based on the result of the classifying and the current operation request.

5. The method of claim 4, wherein the classifying comprises:
   sorting the plurality of historical operation requests according to receiving time points of the plurality of historical operation requests;
   mapping the sorted historical operations requests to a plurality of coordinate points in a coordinate system, each of the plurality of coordinate points corresponding to a predetermined number of the sorted historical operation requests;
   and the plurality of historical operation requests classified based on the plurality of coordinate points.

6. The method of claim 5, wherein determining the predicted operation request based on the result of the classifying and the current operation request comprises:
   mapping the current operation request to a first coordinate point in the coordinate system;
   determining, from the plurality of historical operation requests, a historical operation request matching the current operation request based on the first coordinate point and the plurality of coordinate points; and
   determining a subsequent historical operation request of the matching historical operation request as the predicted operation request.

7. The method of claim 5, further comprising:
   in response to receiving from the user a subsequent operation request immediately after the current operation request, determining whether the subsequent operation request is consistent with the predicted operation request; and
   in accordance with determining that the subsequent operation request is inconsistent with the predicted operation request, obtaining an additional historical operation request or adjusting the predetermined number.

8. An electronic device, comprising:
   at least one processing unit;
   and at least one memory coupled to the at least one processing unit and storing instructions, which when executed by the at least one processing unit, cause the at least one processing unit to execute acts, the acts comprising:
      receiving a current operation request from a user via an Application Programming Interface (API), wherein data, requested by the current operation request, is to be duplicated to a cache, and a name of the API indicating i) a type of an operation associated with the current operation request and ii) a storage location of the data requested by the current operation request;
      obtaining a plurality of historical operation requests of the user, the plurality of historical operation requests being received prior to the current operation request;
      determining a predicted operation request for the user based on the plurality of historical operation requests and the current operation request;

marking, based on the name of the API indicating the type of the operation associated with the current operation request, a range of API names in advance;

determining whether a first type, of a first operation associated with the predicted operation request, belongs to predetermined types, the determining whether the first type belongs to predetermined types comprises determining that the predicted operation request is associated with one of the marked range of API names;

and in response to determining that the predicted operation request is related to the marked range of the API names, adjusting data in the cache based on predicted operation request.

9. The device of claim 8, wherein obtaining the plurality of historical operation requests of the user comprises obtaining at least one of the following:

a name of the user, a role of the user, an identifier of a session initiated by the user, a timestamp when a historical operation request was received, a timestamp when data requested by a historical operation request was provided to the user, a type of an operation associated with a historical operation request, and a storage location of data requested by a historical operation request.

10. The device of claim 8, wherein determining the predicted operation request for the user comprises determining a storage location of data requested by the predicted operation request.

11. The device of claim 8, wherein determining the predicted operation request for the user comprises:

classifying the plurality of historical operation requests using a classification model, a result of the classifying indicating a subsequent historical operation request of each of the plurality of historical operation requests; and determining the predicted operation request based on the result of the classifying and the current operation request.

12. The device of claim 11, wherein the classifying comprises:

sorting the plurality of historical operation requests according to receiving time points of the plurality of historical operation requests;

mapping the sorted historical operations requests to a plurality of coordinate points in a coordinate system, each of the plurality of coordinate points corresponding to a predetermined number of the sorted historical operation requests;

and the plurality of historical operation requests classified based on the plurality of coordinate points.

13. The device of claim 12, wherein determining the predicted operation request based on the result of the classifying and the current operation request comprises:

mapping the current operation request to a first coordinate point in the coordinate system;

determining, from the plurality of historical operation requests, a historical operation request matching the current operation request based on the first coordinate point and the plurality of coordinate points; and determining a subsequent historical operation request of the matching historical operation request as the predicted operation request.

14. The device of claim 12, wherein the acts further comprise:

in response to receiving from the user a subsequent operation request immediately after the current operation request, determining whether the subsequent operation request is consistent with the predicted operation request; and in accordance with determining that the subsequent operation request is inconsistent with the predicted operation request, obtaining an additional historical operation request or adjusting the predetermined number.

15. A computer program product tangibly stored on a non-transitory computer storage medium and comprising machine-executable instructions, which when executed by a processor, cause the processor to perform acts, the acts comprising:

receiving a current operation request from a user via an Application Programming Interface (API), wherein data, requested by the current operation request, is to be duplicated to a cache, and a name of the API indicating i) a type of an operation associated with the current operation request and ii) a storage location of the data requested by the current operation request;

obtaining a plurality of historical operation requests of the user, the plurality of historical operation requests being received prior to the current operation request;

determining a predicted operation request for the user based on the plurality of historical operation requests and the current operation request;

marking, based on the name of the API indicating the type of the operation associated with the current operation request, a range of API names in advance;

determining whether a first type, of a first operation associated with the predicted operation request, belongs to predetermined types, the determining whether the first type belongs to predetermined types comprises:

determining that the predicted operation request is associated with one of the marked range of API names;

and in response to determining that the predicted operation request is related to the marked range of the API names, adjusting data in the cache based on predicted operation request.

16. The computer program product of claim 15, wherein obtaining the plurality of historical operation requests of the user comprises obtaining at least one of the following:

a name of the user, a role of the user, an identifier of a session initiated by the user, a timestamp when a historical operation request was received, a timestamp when data requested by a historical operation request was provided to the user, a type of an operation associated with a historical operation request, and a storage location of data requested by a historical operation request.

17. The computer program product of claim 15, wherein determining the predicted operation request for the user comprises determining a storage location of data requested by the predicted operation request.

18. The computer program product of claim 15, wherein determining the predicted operation request for the user comprises:

classifying the plurality of historical operation requests using a classification model, a result of the classifying indicating a subsequent historical operation request of each of the plurality of historical operation requests; and determining the predicted operation request based on the result of the classifying and the current operation request.

19. The computer program product of claim 18, wherein the classifying comprises:
sorting the plurality of historical operation requests according to receiving time points of the plurality of historical operation requests;
mapping the sorted historical operations requests to a plurality of coordinate points in a coordinate system, each of the plurality of coordinate points corresponding to a predetermined number of the sorted historical operation requests;
and the plurality of historical operation requests classified based on the plurality of coordinate points.

20. The computer program product of claim 19, wherein determining the predicted operation request based on the result of the classifying and the current operation request comprises:
mapping the current operation request to a first coordinate point in the coordinate system;
determining, from the plurality of historical operation requests, a historical operation request matching the current operation request based on the first coordinate point and the plurality of coordinate points; and
determining a subsequent historical operation request of the matching historical operation request as the predicted operation request.

21. The computer program product of claim 19, wherein the acts further comprise:
in response to receiving from the user a subsequent operation request immediately after the current operation request, determining whether the subsequent operation request is consistent with the predicted operation request; and
in accordance with determining that the subsequent operation request is inconsistent with the predicted operation request, obtaining an additional historical operation request or adjusting the predetermined number.

* * * * *